United States Patent [19]
Gaechter

[11] Patent Number: 5,892,576
[45] Date of Patent: Apr. 6, 1999

[54] PROCESS AND DEVICE FOR THE ELECTRO-OPTICAL MEASUREMENT OF DISTANCE

[75] Inventor: Bernhard Gaechter, Balgach, Switzerland

[73] Assignee: Leica AG, Heerbrugg, Switzerland

[21] Appl. No.: 817,097

[22] PCT Filed: Sep. 21, 1995

[86] PCT No.: PCT/EP95/03712

§ 371 Date: Jul. 2, 1997

§ 102(e) Date: Jul. 2, 1997

[87] PCT Pub. No.: WO96/12203

PCT Pub. Date: Apr. 25, 1996

[30] Foreign Application Priority Data

Oct. 13, 1994 [DE] Germany ............... 44 36 447.4

[51] Int. Cl.⁶ ............... G01C 3/08; G01S 13/08
[52] U.S. Cl. ............... 356/5.05; 312/134; 312/135; 312/145
[58] Field of Search ............... 342/134, 135, 342/145; 356/5.05, 5.09

[56] References Cited

U.S. PATENT DOCUMENTS

| 3,647,298 | 3/1972 | Soules ............... 356/5.09 |
| 3,967,111 | 6/1976 | Brown ............... 356/5.09 |
| 5,005,085 | 4/1991 | Spies et al. ............... 358/213.11 |
| 5,026,153 | 6/1991 | Suzuki et al. ............... 356/1 |
| 5,115,242 | 5/1992 | Nagamune et al. ............... 342/145 |
| 5,179,286 | 1/1993 | Akasu ............... 280/561 |
| 5,337,052 | 8/1994 | Lohrmann et al. ............... 342/145 |

FOREIGN PATENT DOCUMENTS

| 0 312 524 | 4/1989 | Germany . |
| 3 839 512 | 5/1990 | Germany . |
| 4 006 300 | 9/1990 | Germany . |
| 4 031 668 | 4/1992 | Germany . |
| 4 133 196 | 4/1992 | Germany . |

OTHER PUBLICATIONS

Mac Williams et al., "The Theory of Error–Correcting Codes", North Holland Publishing Co., pp. 407–412, 1981.

*Primary Examiner*—Stephen C. Buczinski
*Attorney, Agent, or Firm*—Foley & Lardner

[57] ABSTRACT

A method and apparatus for electro-optical distance measurement. A series of pulses provided by a laser are received as echoes by a receiver. The pulses are each produced within respective intervals having a common predetermined duration. Each pulse is time-shifted relative to the beginning of its corresponding interval. A pulse pattern comprising echo signals for each of a series of pulses is used to determine the distance to an object producing the echoes.

12 Claims, 4 Drawing Sheets

PROCESS AND DEVICE FOR THE ELECTRO-OPTICAL MEASUREMENT OF DISTANCE

BACKGROUND OF THE INVENTION

The invention relates to a method for electro-optical distance measurement. The invention further relates to a device for carrying out the method.

EP 0,312,524 B1 discloses a method for electro-optical distance measurement according to the pulse time-of-flight method, in which individual radiation pulses are transmitted periodically by a transmitter and detected as echo signals by a receiver. The detected radiation pulse signals are sampled, digitized, added period-fashion in an adder and then stored in a memory. A memory location of the memory is respectively assigned for the sampling values of a period. At the start of each transmission of a radiation pulse signal, the sampling values of the detected radiation pulse signals are added to the already-stored sampling values of the radiation pulse signals detected in the previous period. With an increasing number of measurements, the addition of the sampling values leads to the formation of a sum pulse signal, from the time position of which in relation to the time of the pulse transmission, the time of flight of the radiation pulse signal can be determined. A disadvantage of this method is that a high sampling rate is required in order to ascertain the precise position of the echo signal. Since the sampling rate is limited for technical reasons, and, in addition, a higher sampling rate requires a larger memory, only a particular number of sampling values per impulse signal are available for evaluation. As a result, errors may occur when the time position of the detected pulse signal is determined, especially if the shape of the pulse signal is altered by external effects.

In addition, DE 40 31 668 A1 discloses a method for electro-optical distance measurement, in which a sequence of individual light pulses is transmitted periodically. The signal transmitted as a pulse sequence is a spread-band signal, so that the duration of the transmitted signal is substantially greater than the reciprocal spectral bandwidth thereof. After a pulse sequence has been transmitted, the next pulse sequence is transmitted, the detected light signals being added with the period of the pulse sequence and stored. In order to determine the time of flight, the transmitted pulse sequences need to be reflected on two measurement objects. The two times of flight of the pulse sequences are approximated by using a maximum likelihood algorithm, so that the distance can be determined by ascertaining the difference in time of flight. A disadvantage with this known method is that transmitters, in particular pulse laser diodes with about 1000-fold greater peak power and comparable average power to CW laser diodes, cannot be used. Since, with pulse laser diodes, a comparatively large time must be waited before the next pulse is transmitted, it is not possible to transmit a spread-band signal.

SUMMARY OF THE INVENTION

The technical object of the invention is to provide a method, and a device for carrying out the method, so that the accuracy in the determination of the time position of the detected pulse signal is increased.

This object is achieved by the features referred to below.

The individual radiation-pulse signals are each transmitted while being shifted by a shift interval with respect to the start of a constant pulse transmission interval. The pulse transmission interval is determined by the pulse repetition time of the transmitter. The length of the shift interval is selected in such a way that, after the transmission of a specific number of individual pulse signals, an equal number of echo signals, respectively shifted by the corresponding shift interval next to one another on an imaginary time axis, are stored. These echo signals, stored with a time shift, represent a pulse pattern which can be imposed by pre-selection of the length of the shift intervals. After a pulse pattern, consisting of a desired number of echo signals, has been formed, the measurement is repeated so that the echo signals in the subsequent measurement are added to the already-stored echo signals. These measurements are repeated until the echo signals stand out sufficiently from the noise signals. By comparison with a predetermined reference pattern, the time of flight can be determined using suitable calculation methods.

With the invention, the accuracy of the measurement is increased. As a result of the fact that the duration between the transmission of neighboring radiation pulse signals corresponds to at least one pulse transmission interval, the individual radiation pulse signals can have a high peak power. After detection of the echo signals, there is a pulse pattern whose time position with respect to a reference pattern can be used to determine the time of flight accurately. The invention is based on the discovery that the accuracy of the measurement increases, on the one hand, with the peak power of the transmitter, which in accordance with the invention may be 10 W, and, on the other hand, only with $\sqrt{M}$ of the number of detected pulse patterns. A measurement result with higher accuracy is thus provided within the same measuring time, or with equal accuracy in a shorter measuring time.

According to one development of the invention, the detected echo pulse pattern is produced by time-delayed transmission of the individual radiation pulse signals. The reference point for the time delay by a respective shift interval is formed by the start of a pulse transmission interval. The shift intervals preferably have different lengths, the lengths being formed according to a random pattern, so that the detected echo pattern is randomly distributed to the same extent.

If the pulse pattern forms an m-sequence, then the measurement accuracy is particularly high since for m-sequences autocorrelation is possible, resulting in a delta function.

A plurality of known calculation methods can be used for the computer evaluation of the echo pattern. On the one hand, the echo signal may be correlated with a reference pulse signal. On the other hand, suitable estimation methods, for example minimum variance or according to the maximum likelihood principle, can be used to ascertain the time position of the echo signal, in order to calculate the desired time of flight therefrom.

For application of the method according to the invention, use may advantageously be made of a pulse laser with comparatively high peak power, for example with a peak power of 5 to 10 W. By this means, the signal/noise ratio is increased and, at the same time, because of the relatively large recovery time of the laser, a large measurement range can be covered. In this case, that time interval of the measurement range which is irrelevant to the measurement according to the application case, can be used to carry out other appropriate calculation operations in the computer.

According to a development of the invention, the receiver consists of a CCD module. In the latter, the echo signals are temporarily stored in a multiplicity of CCD memories and added. The sum signal can then be fed to the signal processing unit for evaluation at the end of the measurement.

Advantageously, the CCD module can be used in single-chip architecture. The storage capacity can be extended arbitrarily, it being possible to obtain and further process additional image information relating to the measurement object by the provision of further CCD modules.

BRIEF DESCRIPTION OF THE DRAWINGS

Two illustrative embodiments of the invention are represented in the drawing and will be described in more detail below.

DETAILED DESCRIPTION OF THE PREFERRED EMBODIMENTS

Figure 1:
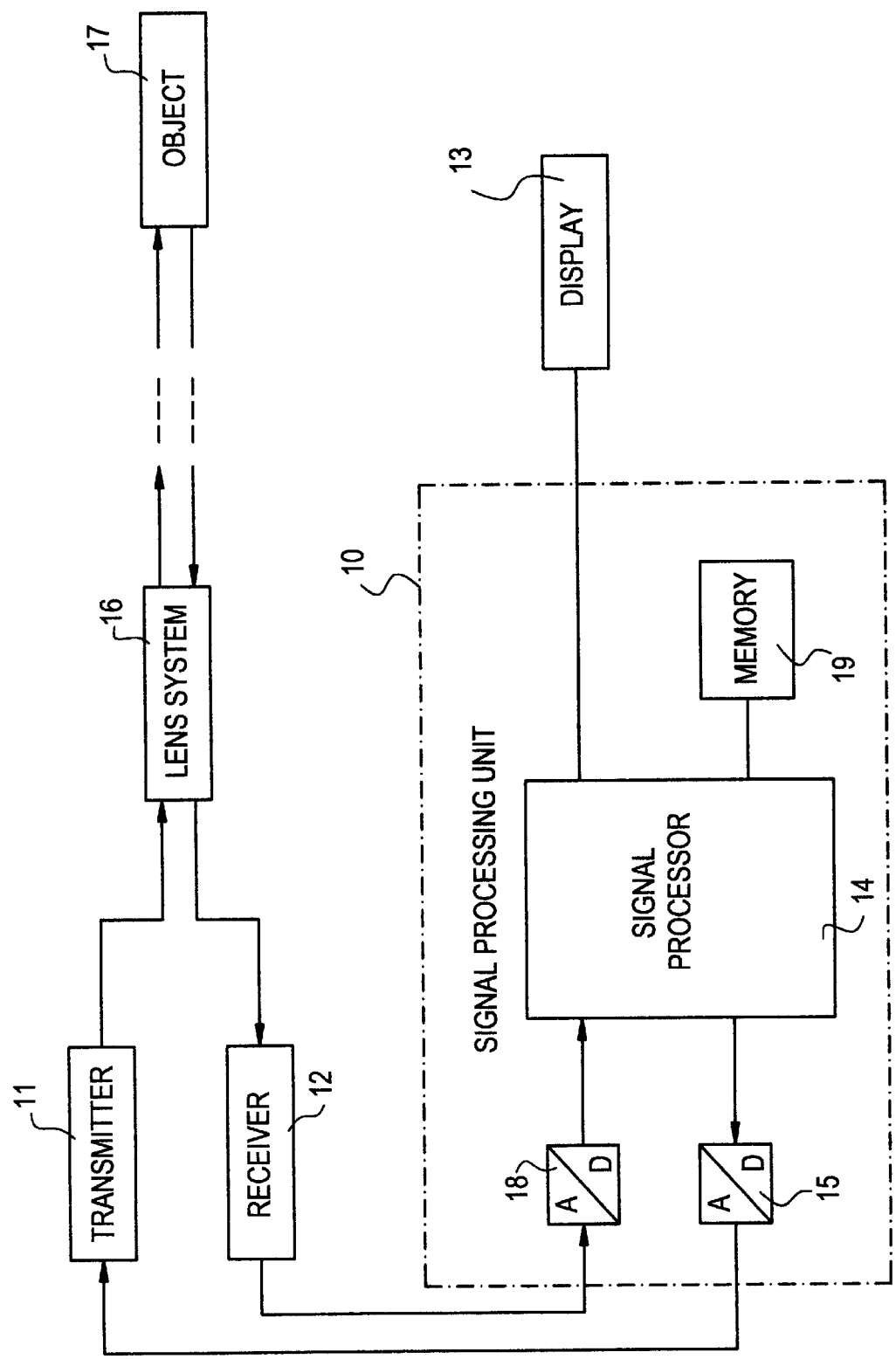
FIG. 1 shows a block circuit diagram of a preferred illustrative embodiment.

According to a preferred illustrative embodiment according to FIG. 1, the device for measuring distance consists of a signal processing unit 10 which is electrically coupled to a transmitter 11, a receiver 12 and a display 13. The signal processing unit 10 has a signal processor 14 which, at the start of a distance measurement, emits a start signal via a digital/analog converter 15 to the transmitter 11. The transmitter 11 consists of a laser which emits individual high-power radiation pulse signals. The peak power of the laser is preferably 5 to 10 watts.

The radiation pulse signals transmitted by the transmitter 11 leave the device through a lens system 16 and impinge on a measurement object 17, from which they are reflected and subsequently acquired by the receiver 12. The radiation pulse signals detected in the receiver 12 are fed as echo signals to an analog/digital converter 18 of the signal processing unit 10 and subsequently further processed in the signal processor 14. A memory 19 is used for storing the measurement results of a measurement interval. In this case, the echo signals are sampled with a sampling rate of about 40 MHz. The echo-signal sampling values, obtained therefrom within a measurement interval, are each assigned to a memory location in the memory 19. The calculated measurement result is then displayed in a display 13.

Figure 2:
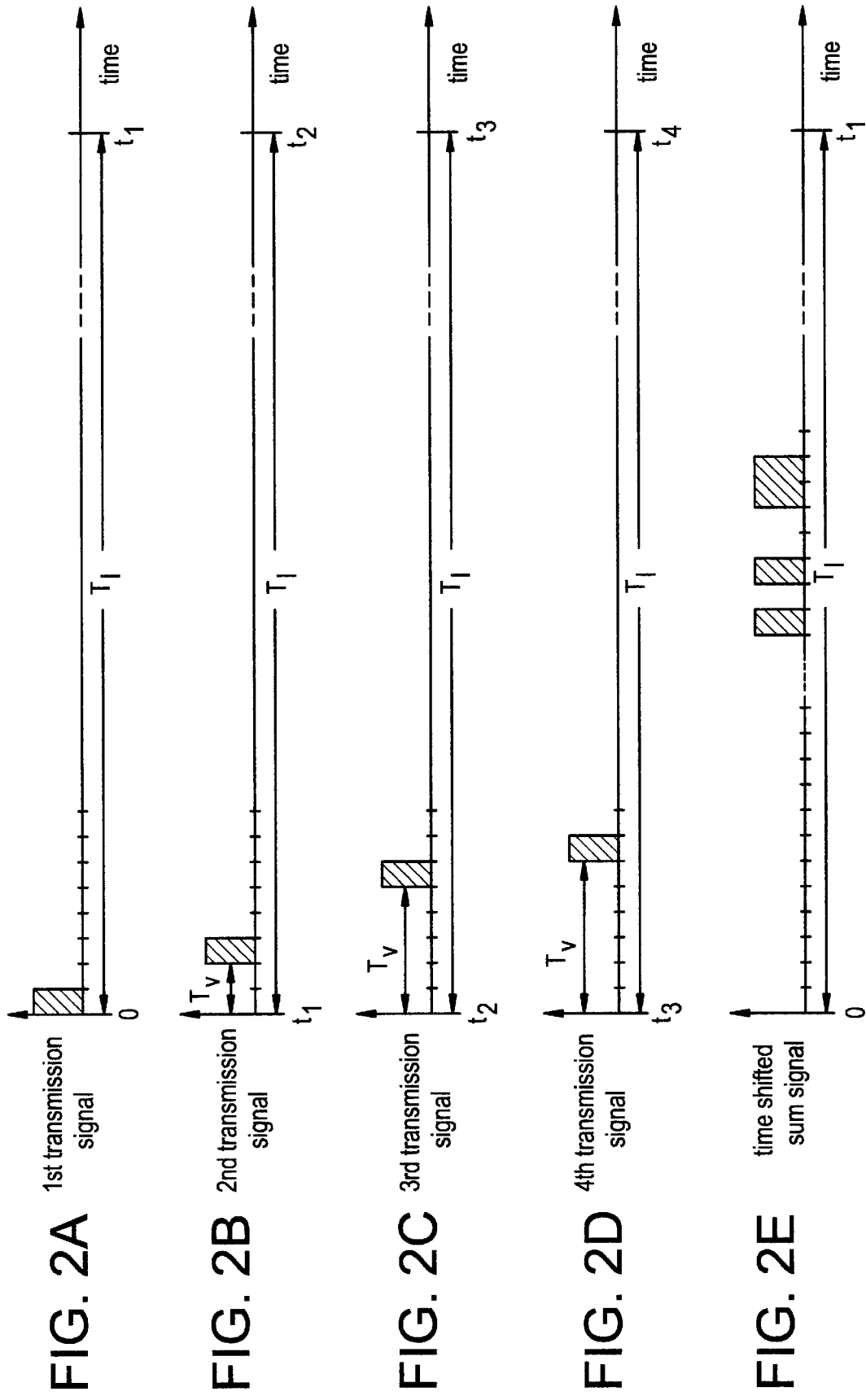
FIG. 2 is a time diagram with radiation pulse signals respectively transmitted in a measurement interval and with a sum signal, consisting of time-shifted echo pulse signals.
Figure 3:
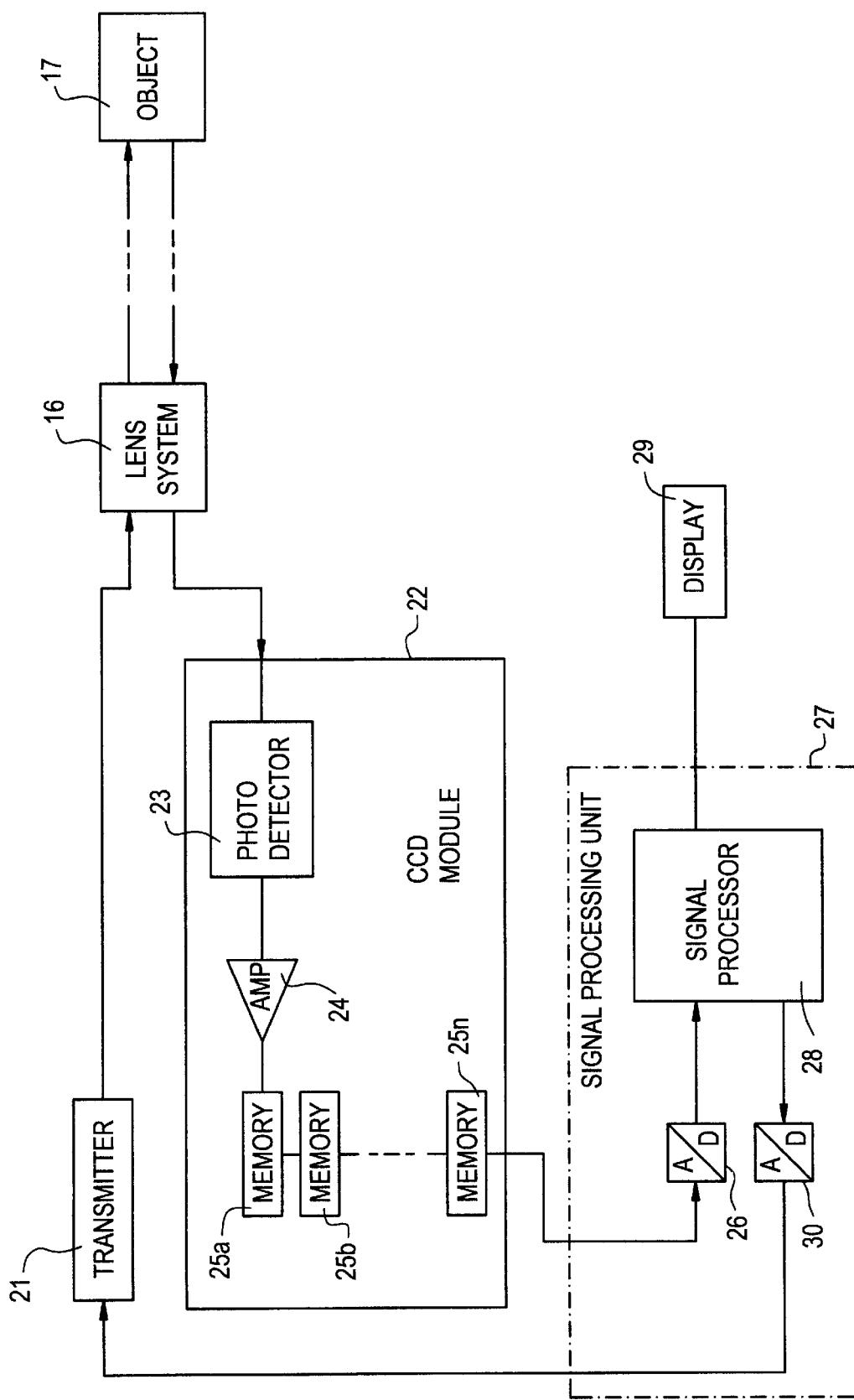
FIG. 3 shows a block circuit diagram of a further illustrative embodiment.

The method for measuring distance is described below with reference to FIG. 2. The transmission of the individual radiation pulse signals by means of the transmitter 11 is controlled by the signal processor 14. In order to increase the signal/noise ratio, a multiplicity of radiation pulse signals are transmitted one after the other, the detected radiation pulse signal being added and stored in the memory 19. The pulse signals are respectively transmitted as single-pulse signals within a pulse transmission interval $T_I$. The duration of the pulse transmission interval $T_I$ corresponds to the repetition time of the transmitter 11. The measurement interval is established by the predetermined measurement range. In order, for example, to obtain a measurement range of 3000 meters, the measurement interval corresponds to one quarter of the duration of the pulse transmission interval $T_I$ for a laser repetition time of about 100 μs. The transmission of the individual pulse signals is controlled, by the signal processor 14 in such a way that the radiation pulse signals are not transmitted periodically, but with a time shift with respect to the period of the pulse transmission interval $T_I$. If, as represented in FIG. 2a, the transmission of a first transmission pulse signal takes place at the start of a pulse transmission interval $T_I$, then the following second transmission pulse signal is transmitted with a time shift with respect to the start of the second pulse transmission interval $T_I$, i.e. at time $t_I$, by a shift interval $T_V$. The time shift of the transmission pulse signals continues with each further pulse transmission interval $T_I$, the detected signals of a pulse transmission interval $T_I$ being added to the detected signals, stored in the memory 19, of the previous pulse transmission interval $T_I$.

The fact that the duration of the shift interval $T_V$ is greater than the radiation pulse duration prevents the echo signals of neighboring measurement intervals from being superposed. As can be seen from FIG. 2e), after four measurement intervals have elapsed, an echo pulse pattern is stored in the memory 19, the spacing of the echo signals depending on the size of the shift intervals $T_V$. For example, the shift intervals may be chosen so that the resulting pulse sequence forms an m-sequence or a pseudostochastic sequence. As an alternative, the shift interval $T_V$ may also be selected as constant. This produces a sum pulse sequence with equidistant pulse intervals.

In order to obtain a resulting pulse pattern, the signal processor 14 supplies the transmitter 11 with start signals whose time sequence is programmable, while the received echo signals are continuously provided to the signal processor 14 by the A/D converter 18. The time interval occurring between the start of two transmitted radiation pulse signals is composed of the duration of the pulse transmission interval $T_I$ and the shift interval $T_V$. As shown in FIG. 2e), after the transmission of four radiation pulse signals, a pulse sequence results which represents a spread-band signal whose length corresponds to the duration of seven radiation pulses. The length of the resulting pulse sequence can be extended arbitrarily. After a number of radiation pulse signals, which is sufficient to form a desired pulse sequence, have been transmitted (according to FIG. 2 four radiation pulse signals have been transmitted) the transmission time sequence, controlled by the signal processor 14, starts afresh. This transmission time sequence is repeated until a sufficient signal/noise ratio is ensured.

As an alternative, the control mechanism for forming the desired pulse sequence may be designed in such a way that the radiation pulse signals are transmitted by the transmitter 11 periodically with the start of the pulse transmission interval $T_I$, while the sampling of the echo signals in the A/D converter 18 starts at one shift interval earlier. This can be achieved by program-controlled reading into a register of the signal processor 14. The desired pulse pattern is thus produced.

In order to determine the time of flight, from which the distance can be calculated, the resulting pulse sequence is compared with a reference pulse sequence. The reference pulse sequence is preferably determined by a calibration measurement, the distance of the reference measurement object from the measuring instrument being approximately zero. According to known mathematical approximation methods, for example using the maximum likelihood approximation algorithm disclosed by DE 40 31 668 A1 or the minimum variance method, the time of flight can subsequently be determined. As an alternative, the time of flight can be determined by correlating the resulting pulse sequence with the reference pulse sequence.

According to a further illustrative embodiment, the device for measuring distance consists of an analog receiver, which is constructed using CCD technology. The receiver consists of a CCD module 22 which consists of a photodetector 23, an amplifier 24 downstream thereof and a sequence of analog CCD memories 25. The volume of data for one measurement interval can be stored in each analog CCD memory 25. The CCD memories 25 are arranged in a line, the neighboring CCD memories 25 being connected to a number of transfer gates, corresponding to the number of data per measurement interval, for transferring these data. After the data of the first measured measurement interval have been read into the memory 25a, these data are transferred during a read-out cycle via the transfer gates to the neighboring CCD memory 25b, and stored there. After a further measurement interval has elapsed, these data are transferred from the CCD memory 25b to the further neighboring CCD memory. After a specific number n of measurement intervals, the data are transferred into the memory 25n, and respective following data are added to the CCD memory 25 in subsequent read-out cyclia. After a sufficient number of transmitted radiation pulse signals, the detected echo signals are read from the CCD memory 25n into an A/D converter 26 of a signal processing unit 27 and converted into digital signals. A signal processor 28 arranged in the signal processing unit 27 is used, in similar fashion to the above-described illustrative embodiment, on the one hand, for controlling the transmitted radiation pulse signals or the received echo signals and, on the other hand, for determining the time of flight using a mathematical estimation method. The measurement result which is obtained can subsequently be displayed in a display 29. The start signal of the signal processor 28 is fed to the transmitter 21 via a D/A converter 30. The transmission of the radiation pulse signals is controlled in similar fashion to the first illustrative embodiment.

Figure 4:
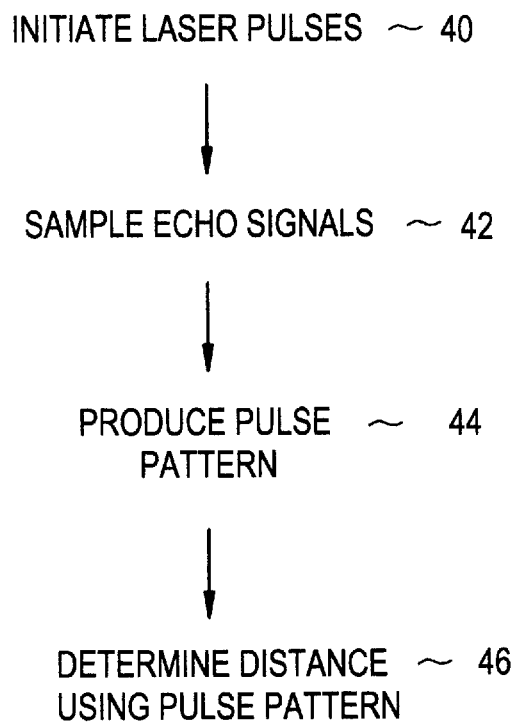
FIG. 4 illustrates steps in process in accordance with the invention.

Accordingly, an apparatus in accordance with the invention may perform process steps as illustrated in FIG. 4. The apparatus initiates laser pulses (step 40) of a predetermined duration within successive corresponding intervals of a predetermined length. The initiation of each pulse is time-shifted from the beginning of its corresponding interval by an amount that varies with respect to a time shift amount of each of the preceding pulses by no less than a respective corresponding pulse duration of each of said preceding pulses. Echo signals corresponding to each laser pulse of the series are sampled (step 42). The echo signals are used to produce a pulse pattern (step 44) comprising the echo signals corresponding to the series of laser pulses. The apparatus then determines a distance to the source of the echo signals (step 46) using the pulse pattern, as described above.

I claim:

1. An electro-optical distance measurement system, comprising:

a laser for producing pulses;

a receiver for producing echo signals corresponding to echoes of pulses produced by said laser; and a processor for controlling said system to provide the functions of:

initiating laser pulses within successive corresponding intervals of equal length, the initiation of each pulse being time-shifted from the beginning of its corresponding interval by an amount which varies with respect to a time shift amount of each of preceding pulses by no less than a respective corresponding pulse duration of each of said preceding pulses;

sampling echo signals;

producing a pulse pattern comprising echo signals corresponding to a series of laser pulses;

determining a distance to a source of said echo signals using said pulse pattern.

2. The system of claim 1, further comprising an analog storage unit for sequentially storing sampled echo signals to form said pulse pattern.

3. The system of claim 1, wherein said receiver comprises:

at least one CCD module including a photodetector for producing said echo signals; and at least two analog memories for storing said echo signals.

4. The system of claim 3, wherein each of said at least two analog memories comprises a CCD memory connected by transfer gates to a neighboring CCD memory for transferring echo signals thereto.

5. A method for generating a pulse pattern for an electro-optical time-of-flight distance measurement system, comprising:

initiating laser pulses of a predetermined duration within successive corresponding intervals of equal length, the initiation of each pulse being time-shifted from the beginning of its corresponding interval by an amount which varies with respect to a time shift amount of each of preceding pulses by no less than a respective corresponding pulse duration of each of said preceding pulses;

sampling echo signals corresponding to a series of laser pulses;

producing a pulse pattern comprising echo signals corresponding to a series of laser pulses; and determining a distance to a source of said echo signals using said pulse pattern.

6. The method of claim 5, wherein each of said pulses has a common predetermined duration.

7. The method of claim 6, wherein each of said pulses is time-shifted by an amount equalling an integer multiple of said common predetermined duration.

8. The method of claim 5, wherein said pulse pattern forms an m-sequence.

9. The method of claim 5, comprising the further step of correlating said pulse pattern with a predetermined reference pattern to provide an estimated value of a distance to a source of said echo signals.

10. The method of claim 5, wherein said pulses are time-shifted such that said pulse pattern forms a pseudo-stochastic sequence.

11. The method of claim 10, wherein said step of determining a distance to a source of said echo signals comprises performing a maximum-likelihood determination.

12. The method of claim 10, wherein said step of determining a distance to a source of said echo signals comprises performing a minimum-variance determination.

* * * * *